United States Patent
Chandrahasan et al.

(10) Patent No.: US 12,326,852 B2
(45) Date of Patent: Jun. 10, 2025

(54) IDENTIFYING ANOMALOUS TRANSFORMATIONS USING LINEAGE DATA

(71) Applicant: International Business Machines Corporation, Armonk, NY (US)

(72) Inventors: Rajmohan Chandrahasan, Kanchipuram (IN); Himanshu Gupta, New Delhi (IN); Sameep Mehta, Bangalore (IN); Emma Rose Tucker, Austin, TX (US); Andrzej Jan Wrobel, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 346 days.

(21) Appl. No.: 17/239,900

(22) Filed: Apr. 26, 2021

(65) Prior Publication Data
US 2022/0342869 A1   Oct. 27, 2022

(51) Int. Cl.
*G06F 16/23* (2019.01)
*G06F 16/21* (2019.01)
*G06F 16/22* (2019.01)

(52) U.S. Cl.
CPC ........ *G06F 16/2365* (2019.01); *G06F 16/219* (2019.01); *G06F 16/221* (2019.01); *G06F 16/2358* (2019.01)

(58) Field of Classification Search
CPC .. G06F 16/2365; G06F 16/221; G06F 16/219; G06F 16/2358
See application file for complete search history.

(56) References Cited

U.S. PATENT DOCUMENTS 11,003,645 B1 * 5/2021 Thompson ............... G06F 16/26
11,010,415 B2 * 5/2021 Richtarsky ............ G06F 16/221
(Continued)

OTHER PUBLICATIONS

Herath, J. Dinal, et al. "Ramp: Real-Time Anomaly Detection in Scientific Workflows." 2019 IEEE International Conference on Big Data (Big Data). IEEE, 2019.
(Continued)

*Primary Examiner* — Sherief Badawi
*Assistant Examiner* — Earl Elias
(74) *Attorney, Agent, or Firm* — Ryan, Mason & Lewis, LLP

(57) ABSTRACT

Methods, systems, and computer program products for identifying anomalous transformations using lineage data are provided herein. A computer-implemented method includes generating a set of column profiles for a corresponding set of columns within one or more datasets based at least in part on lineage data and glossary data, wherein the lineage data comprises information related to transformations performed on each column in the set by a computing platform, and wherein the glossary data comprises information related to one or more terms assigned to one or more of the columns; obtaining information related to a new transformation involving at least one column in the set of columns; comparing the new transformation to the set of column profiles to determine whether the new transformation is anomalous; and in response to determining the new transformation is anomalous, outputting an alert to a user of the computing platform.

20 Claims, 7 Drawing Sheets

(56) References Cited

U.S. PATENT DOCUMENTS

| | | | | |
|---|---|---|---|---|
| 2005/0192998 | A1* | 9/2005 | Dittrich | G06F 16/2228 707/999.102 |
| 2013/0332423 | A1 | 12/2013 | Puri et al. | |
| 2014/0114818 | A1 | 4/2014 | Olsen et al. | |
| 2017/0220626 | A1 | 8/2017 | Kashalikar et al. | |
| 2017/0364274 | A1* | 12/2017 | Hammons | G06F 11/3438 |
| 2018/0089261 | A1* | 3/2018 | Li | G06F 16/2453 |
| 2020/0057757 | A1 | 2/2020 | Spitz et al. | |
| 2020/0117726 | A1* | 4/2020 | S | G06F 16/221 |
| 2020/0379974 | A1* | 12/2020 | Stennett | G06F 16/2365 |

OTHER PUBLICATIONS

Fadolalkarim, Daren, Asmaa Sallam, and Elisa Bertino. "PANDDE: provenance-based anomaly detection of data exfiltration." Proceedings of the Sixth ACM Conference on Data and Application Security and Privacy. 2016.

Nwafor, Ebelechukwu, Andre Campbell, and Gedare Bloom. "Anomaly-based intrusion detection of IoT device sensor data using provenance graphs." 1st International Workshop on Security and Privacy for the Internet-of-Things. vol. 59. 2018.

Liao, Cong, and Anna Squicciarini. "Towards provenance-based anomaly detection in MapReduce." 2015 15th IEEE/ACM International Symposium on Cluster, Cloud and Grid Computing. IEEE, 2015.

Tariq, Dawood, et al. "Identifying the provenance of correlated anomalies." Proceedings of the 2011 ACM Symposium on Applied Computing. 2011.

Han, Xueyuan, et al. "Unicorn: Runtime provenance-based detector for advanced persistent threats." arXiv preprint arXiv:2001.01525 (2020).

Augmented Data Lineage: What It Is, and Why It Matters, available at https://www.ataccama.com/ru/blog/augmented-data-lineage-what-it-is-and-why-it-matters, Ataccama, last accessed Apr. 11, 2021.

Logothetis, Dionysios, Soumyarupa De, and Kenneth Yocum. "Scalable lineage capture for debugging disc analytics." Proceedings of the 4th annual Symposium on Cloud Computing. 2013.

Mell, Peter, et al., The NIST Definition of Cloud Computing, National Institute of Standards and Technology, U.S. Department of Commerce, NIST Special Publication 800-145, Sep. 2011.

* cited by examiner

IDENTIFYING ANOMALOUS TRANSFORMATIONS USING LINEAGE DATA

BACKGROUND

The present application generally relates to information technology and, more particularly, to identifying anomalous activity in data platforms.

Generally, a data platform can enable users to work on a large number of different types of assets. A lineage service can track lineage data of transformations occurring on the data platform, where the transformations describe how various datasets have been curated and shaped. Generally, lineage data includes details of the transformations at an asset level and/or column level. For example, the lineage data may describe how an asset is derived from other assets or how a column in an asset is derived from columns in other assets.

SUMMARY

In one embodiment of the present disclosure, techniques for finding suspicious transformations using lineage data are provided. An exemplary computer-implemented method includes the steps of generating a set of column profiles for a corresponding set of columns within one or more datasets based at least in part on lineage data and glossary data, wherein the lineage data comprises information related to transformations performed on each column in the set by a computing platform, and wherein the glossary data comprises information related to one or more terms assigned to one or more of the columns; obtaining information related to a new transformation involving at least one column in the set of columns; comparing the new transformation to the set of column profiles to determine whether the new transformation is anomalous; and in response to determining the new transformation is anomalous, outputting an alert to a user of the computing platform.

Another embodiment of the present disclosure or elements thereof can be implemented in the form of a computer program product tangibly embodying computer readable instructions which, when implemented, cause a computer to carry out a plurality of method steps, as described herein. Furthermore, another embodiment of the present disclosure or elements thereof can be implemented in the form of a system including a memory and at least one processor that is coupled to the memory and configured to perform noted method steps. Yet further, another embodiment of the present disclosure or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present disclosure will become apparent from the following detailed description of illustrative embodiments thereof, which is to be read in connection with the accompanying drawings.

DETAILED DESCRIPTION

Example embodiments of the present disclosure include identifying anomalous (e.g., suspicious) transformations occurring on a data and/or compute platform based on lineage data. At least one embodiment includes generating column profiles to identify patterns relating to the usage of how a column in a particular dataset is or has been used. Additionally, or alternatively, the column profiles may identify patterns relating to how the column has been historically derived. As such, a column profile for a given column may include a usage profile and a derivation profile. The column profiles, in some example embodiments, are generated based on the lineage data and/or business glossary data. For example, the lineage data may track all data transformations that have happened on each column in each dataset, and the glossary data may specify the entity or concept represented by each column. In one or more embodiments, a group of columns describing a same entity or concept can be identified based at least in part on glossary data, and a consolidated column profile can be derived for each group. Each new transformation may be compared with the column profiles and marked as anomalous in response to the new column not matching the patterns identified by the column profiles. Also, an example embodiment may include identifying anomalous transformations using the column profiles as well as data quality results and constraint analytics.

The term "lineage data" is used herein to refer to data pertaining to events, transformations, and assets present in catalog data. Generally, catalog data includes a list of all datasets present on a data platform, versions of the datasets, and metadata associated with the datasets (e.g., owner, access privileges, tags, descriptions, etc.). For example, the linage data may include, but is not limited to: transformations occurring on each dataset within the data catalog, information related to datasets created and/or updated by each transformation; the columns on which each transformation is occurring and new columns being produced by the transformations; parameters involved in the transformations (e.g., parameters related to SQL statements, data-stage jobs, data refinery flows etc.); timestamps of the transformations; and/or characteristics of a user executing such transformations.

Non-limiting examples of an anomalous transformation include one or more of: a transformation that converts a column to an incorrect type of the data (e.g., string, int, etc.); a transformation that incorrectly maps one or more columns (e.g., a date-of-birth column in an input file is copied to date-of-employment column in output file); a transformation where a column is incorrectly used in a computation (e.g., profit=revenue−total_units_sold); a transformation where an expression is incorrectly used in a computation (e.g., profit=revenue+expenses).

Figure 1:
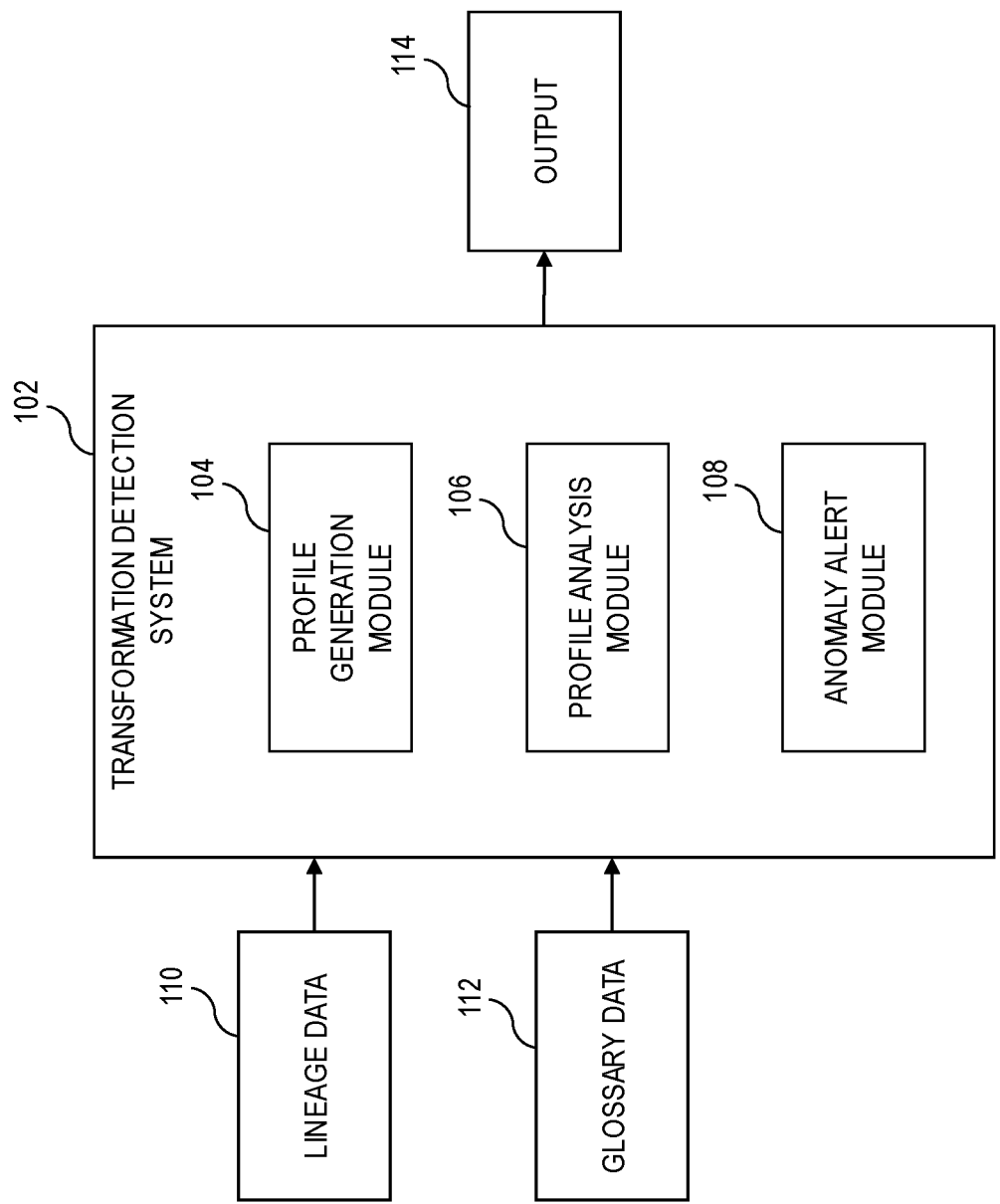
FIG. 1 is a diagram illustrating a system architecture in accordance with exemplary embodiments.

Referring now to FIG. 1, this figure shows a diagram illustrating a system architecture in accordance with exemplary embodiments. The FIG. 1 embodiment includes a transformation detection system 102 that comprises a profile generation module 104, a profile analysis module 106, and an anomaly alert module 108. The transformation detection system 102 obtains lineage data 110. The profile generation module 104 generates column profiles based at least in part on the lineage data 101. For example, the column profiles may include information pertaining to the usage of the columns and/or how the columns are derived.

Optionally, the profile generation module 104 enriches the column profiles using glossary data 112. By way of example, the glossary data 112 may describe the terms (e.g., business terms) assigned to a given asset and/or terms assigned to columns in an asset. As such, the glossary data 112 may be used to correlate similar assets and similar columns across different assets. The column profiles may be enriched by aggregating transformations happening on similar assets and/or columns. For example, consider a column named 'second_name' and another column 'family_name' in another dataset. If the glossary data 112 indicates that each of these columns is assigned to the same term 'family name', then transformations occurring on these columns may be considered together and a single column profile can be created. In such an example, other columns describing the same concept may be named 'last_name', 'surname', etc. Enriching the data in this way provides a more detailed picture of the different kinds of transformations that have previously occurred on columns describing the same concept, which can help determine whether a transformation is an anomaly.

The profile analysis module 106 analyzes the generated column profiles and the lineage data 112 to detect anomalous transformations. As described in more detail herein, the profile analysis module 106 may identify a transformation as being anomalous by comparing how the transformation is being derived or used with how similar transformations have been derived or used based at least in part on the lineage data 112. Further, in some example embodiments, the profile analysis module 106 may account for a quality of datasets resulting from the transformation to determine whether the transformation is anomalous.

The anomaly alert module 108 generates output 114 when an anomalous transformation is detected. The output 114 include, for example, an alert to a user (such as, via a graphical user interface, for example) that an anomalous transformation has been detected. The output 114 may additionally include an explanation of why the transformation was identified as being anomalous and options for a user to indicate whether the transformation is suspicious or not, for example.

According to one or more example embodiments, usage information of a column profile may include at least one of:
1. Information of column names that have been copied or renamed relative to other columns (e.g., a column named 'dob' may be renamed or copied to a column named 'date of birth', 'birth date', etc.).
2. Information indicating with which other columns, a column has been used in a transformation including, for example, a type of the source and target columns.
3. Information categorizing transformations into classes based on the number of columns used (e.g., a column has been used in transformations involving two columns only, involving three columns, etc.).
4. Transformation expressions along with each of the classes from point 3, or a summary of the transformation expressions with each class in point 3. As an example, a summary may include what kind of operations have been applied (e.g., group-by, join, filter etc.).

Figure 2:
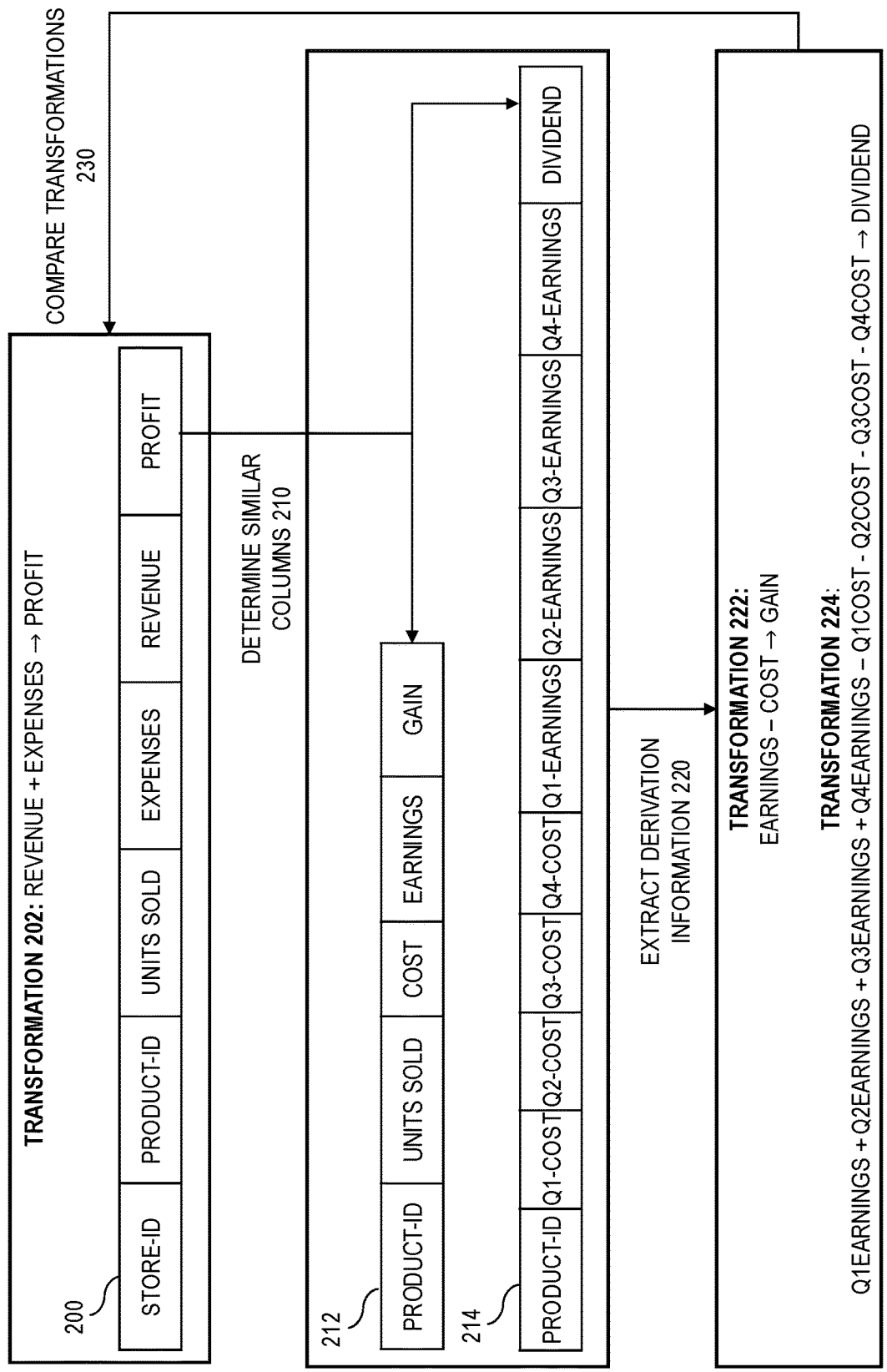
FIG. 2 shows an example of a derivation profile process in an exemplary embodiment.

FIG. 2 shows an example of process for analyzing derivation information of column profiles in accordance with exemplary embodiments. In the FIG. 2 example, a dataset 200 includes columns for profit, expenses, and revenue, and a transformation 202 is applied to the dataset 200. The transformation 202 includes adding expenses to revenue to determine profit (i.e., revenue+expenses→profit). It is instructive to note that transformation 202 should be marked as anomalous as it should be revenue−expenses→profit.

Step 210 includes determining columns in other datasets 212, 214 that are similar to the profit column (e.g., using the usage information in the column profile, glossary data and/or machine learning techniques). In this example, the similar columns are the 'gain' column from dataset 212 and the 'dividend' column from dataset 214. As such, these columns describe a similar concept to the profit column in dataset 200.

Step 220 includes extracting derivation information associated with the 'gain' and 'dividend' columns from the lineage data. In the FIG. 2 example, step 220 identifies a set, S, of transformations 222, 224, which have been previously used to derive the gain and dividend columns. It is noted that the transformations in set S include columns describing a similar concept as described by columns 'revenue' and 'expenses' in dataset 200. The transformations within set S may be "earnings−cost", "receipts−payment," etc., which for the sake of comparison are treated the same as "revenue−expenses". In the FIG. 2 example, the set S includes transformation 222 (indicating gain is derived by subtracting cost from earnings in dataset 212) and transformation 224 (indicating dividend is derived based on: q1earnings+q2earnings+q3earnings+q4earnings−q1cost−q2cost−q3cost−q4cost).

Step 230 includes comparing the transformations 222, 224 with transformation 202. More generally, step 230 may include determining if a given transformation T is not present in S but is similar to a transformation T' in S, which may indicate the transformation T is anomalous. In this example, transformation 202 is similar to, for example, transformation 222 with a different operator (i.e., '+' instead if '−'). As such, the transformation may be marked as anomalous. The determination of whether a given transformation is similar to another transformation may be based on at least one of: one or more configured rules, one or more machine learning techniques, the usage and derivation information in the column profiles, and the glossary data, for example. Other indications that a given transformation may be anomalous include, for example, the order of terms (e.g., "expenses−revenue"), or inclusion of a column describing a new concept (e.g., "earnings−units sold").

One or more example embodiments include analyzing lineage data to identify constraints or rules in the data and matching such constraints with previously computed constraints for other similar data. It is noted that lineage data may include the previously computed constraints. By way of example, consider a case where a business report is created every month. In such an example, constraints on any column or groups of columns should remain similar across reports from different months. As such, one or more example embodiments compute constraints each month a business report is generated, for example, which may describe behavior on a single column or on a group of columns. As non-limiting examples, a constraint on a single column may include total revenue lying between a first range of values.

A constraint on two columns may include: if store is S1, then total revenue lies between a first range of values, and if store is S2, then total revenue is between a second range of values. If one or more constraints on a column or group of columns differ from previously seen constraints (e.g., based on pre-configured rules or thresholds and/or one or more machine learning techniques), then one or more transformations used to derive the current dataset may be marked as anomalous. At least some example embodiments include comparing a set of transformations used to derive the current report with the column usage profiles and/or comparing such transformations with transformations used for previous reports. In at least one embodiment, a given transformation is classified as anomalous in response to at least one of: the transformation is new but similar to another transformation present; a new transformation with no similarity to previous transformations; same transformation but applied in different order.

As an example, assume a January report is created using transformations t1, t2, and t3; a February report is created using transformations t4, t2, and t3; and March report is created using transformations t1, t2, t3, and t5. If the constraints on the March report are determined to be different, then the transformations t1, t2, t3, t5 are checked to determine whether they violate patterns derived from the usage data in the column profiles. Additionally, the transformations t1, t2, t3, t5 can be compared to the transformations used to derive the reports for January and February and compare the patterns to determine whether there is an anomalous transformation.

By way of example, the transformations may be compared by analyzing the columns used in the transformations, operators used with the column usage and derivation profile built using past transformations (e.g., from the lineage data) for generating the same or similar report. Additionally, in some embodiments, the patterns may be compared based on similarity with transformations applied for generating the report in a previous time period (e.g., a month). If the constraints on a given column or group of columns are different from previously seen constraints, then it may indicate that one or more transformations used to derive the current report data are suspicious. In one example embodiment, a transformation is classified as suspicious, if at least one of the following occurs: a new but similar transformation is present; a new transformation with no similarity to previous transformations is present; and the same transformations are present but applied in different order.

Further, at least one example embodiment includes analyzing data quality results to help identify anomalous transformation. For example, data quality issues include, for example, duplicate rows in dataset, data entered in an improper format (e.g., zip code entered in incorrect format); a future date being entered when a date in the past is expected; data entered in wrong column, etc. A user may define quality rules on a dataset and the quality scores may be computed for each quality rule using a quality analyzer tool (e.g., IBM Data Quality Analyzer). If one or more data quality issues are detected on a given dataset, then this may indicate that one or more transformations used to derive the dataset may be problematic. As such, one or more example embodiments include comparing such transformations with the column profiles, and any transformation violating the column profile patterns can be flagged as a potential anomaly. If instances of the same transformation being applied are found in lineage data, and such instances have previously resulted in poor quality datasets, then this can further increase the confidence that the transformation is anomalous. Additionally, instances of similar, but different, transformations (which have processed a same set of columns (or columns with similar or same business terms) and have resulted in good quality datasets indicate that a transformation may contain an error, and hence can be classified suspicious. As such, at least one example embodiment includes assigning a transformation a data quality score and identifying the transformation as being anomalous based at least in part on data quality score satisfying a threshold value.

Figure 3:
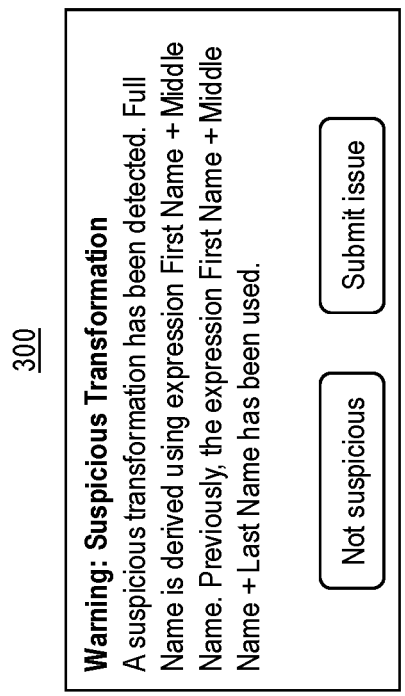
FIG. 3 shows an example of an alert within a graphical user interface in an exemplary embodiment.

FIG. 3 shows an example of an alert 300 within a graphical user interface in accordance with exemplary embodiments. In this example, the alert 300 is generated in response to detecting an anomalous (suspicious) transformation. Specifically, the alert 300 includes details on why the transformation was detected, specifically alert 300 states: "Full Name is derived using expression First Name+Middle Name. Previously, the expression First Name+Middle Name+Last Name has been used." Additionally, alert 300 provides user interface elements for the user to provide feedback regarding the alert, which in the FIG. 3 example include two buttons to mark the transformation as not suspicious and to submit the issue for further analysis.

Figure 4:
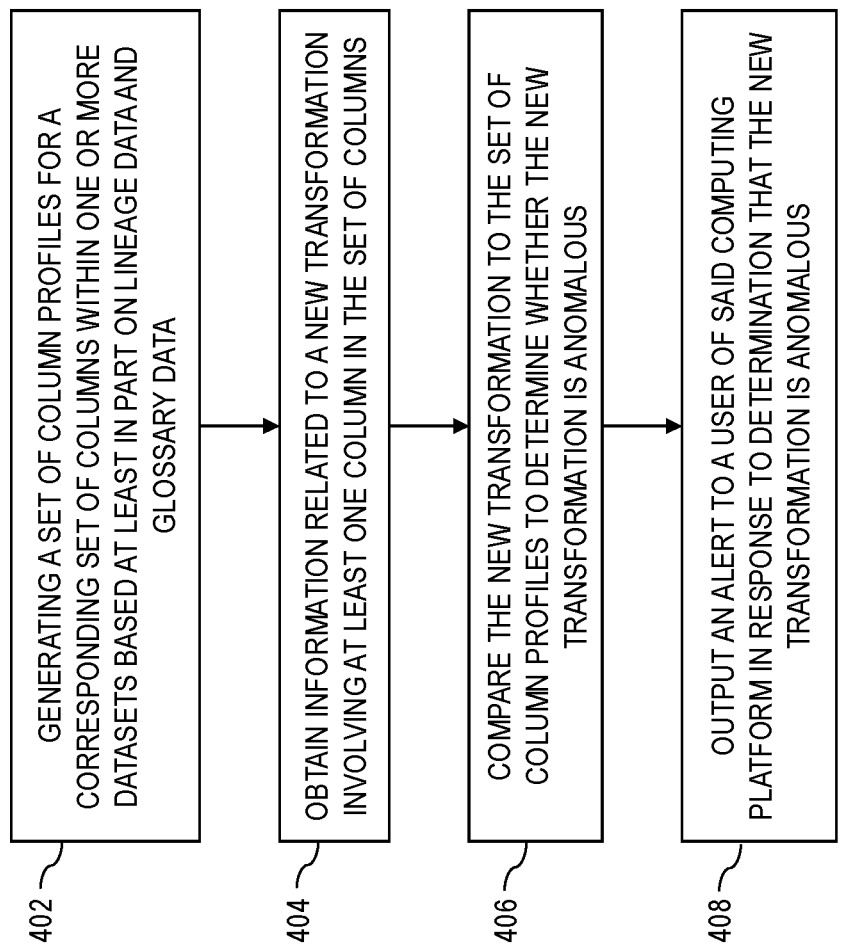
FIG. 4 is a flow diagram illustrating techniques according to an exemplary embodiment.

FIG. 4 is a flow diagram illustrating techniques in accordance with exemplary embodiments. Step 402 includes generating a set of column profiles for a corresponding set of columns within one or more datasets based at least in part on lineage data and glossary data, wherein the lineage data comprises information related to transformations performed on each column in the set by a computing platform, and wherein the glossary data comprises information related to one or more terms assigned to one or more of the columns. Step 404 includes obtaining information related to a new transformation involving at least one column in the set of columns. Step 406 includes comparing the new transformation to the set of column profiles to determine whether the new transformation is anomalous. Step 408 includes in response to determining the new transformation is anomalous, outputting an alert to a user of the computing platform.

The column profile for a given column may include at least one of derivation information of the given column and usage information of the given column.

The generating of step 402 may include determining one or more patterns in the usage data based on the usage information, wherein the one or more patterns are based on at least one of: one or more operators of transformations involving the given column; one or more operands of transformations involving the given column; and an order of the one or more operators and/or the one or more operands. The column profile for a given column may include at least one of: information indicating whether a name of the given column is based on a name of at least one of the other columns in the set of columns; information indicating at least one other column in the set of columns that has been involved in a transformation with the given column; information categorizing transformations performed on the given column based on the number of columns involved in the transformations; and expressions of the transformation performed on the given column. The generating may include determining that one or more columns in the set of columns are related by analyzing the glossary data; and generating a consolidated column profile for the related one or more columns. Comparing the new transformation to the set of column profiles may include: identifying one or more columns in the set of columns related to the at least one column involved in the new transformation; and extracting a set of transformations from the lineage data that involve the related one or more columns; and comparing the extracted set of transformations with the new transformation. Determining whether the new transformation is anomalous may include: identifying one or more transformations in the lineage data that are similar to the new transformation; and determining whether the new transformation is anomalous based on a data quality analysis of data resulting from the identified one or more transformations. Determining whether the new transformation is anomalous may include: analyzing the lineage data to identify one or more constraints associated with one or more of the columns in the set; and determining whether data resulting from the new transformation violates at least one of the constraints. The alert may be output to a graphical user interface and may include at least one of: an explanation of why the new transformation is anomalous; and a user interface element for the user to provide feedback on the new transformation.

The techniques depicted in FIG. 4 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the present disclosure, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 4 can be implemented via a computer program product that can include computer useable program code that is stored in a computer readable storage medium in a data processing system, and wherein the computer useable program code was downloaded over a network from a remote data processing system. Also, in an embodiment of the present disclosure, the computer program product can include computer useable program code that is stored in a computer readable storage medium in a server data processing system, and wherein the computer useable program code is downloaded over a network to a remote data processing system for use in a computer readable storage medium with the remote system.

An exemplary embodiment or elements thereof can be implemented in the form of an apparatus including a memory and at least one processor that is coupled to the memory and configured to perform exemplary method steps.

Figure 5:
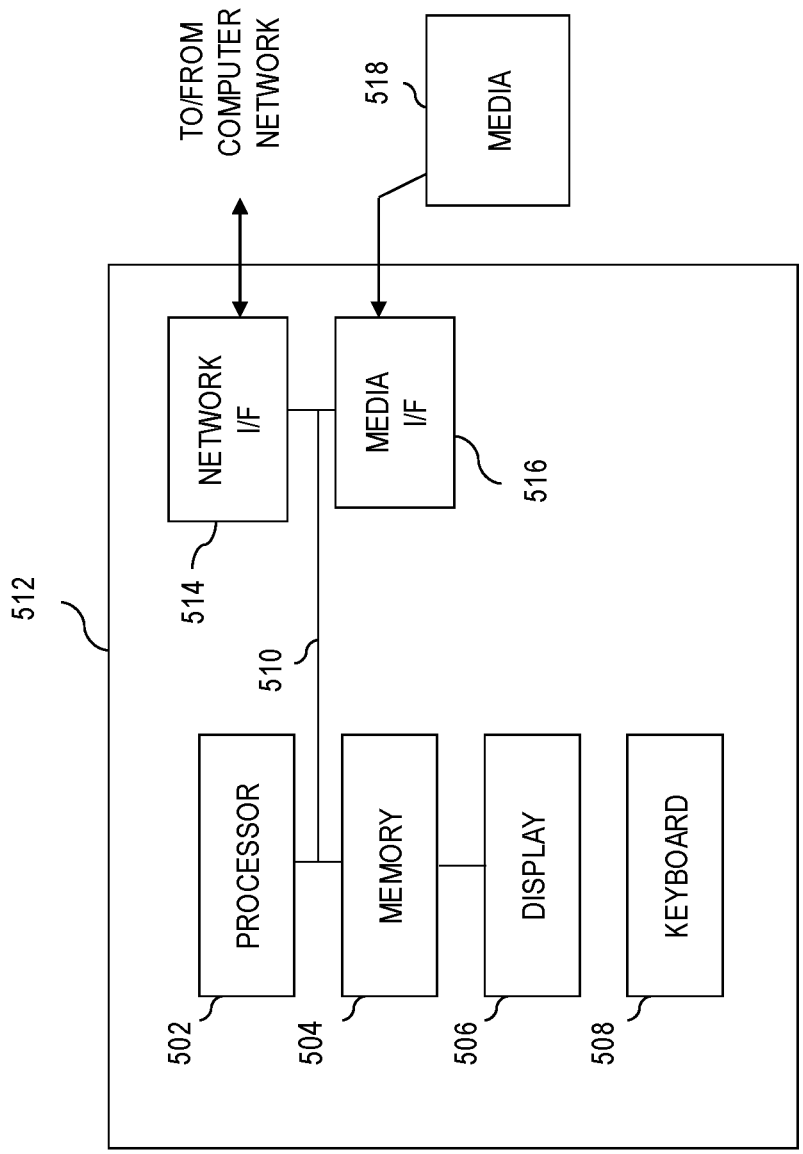
FIG. 5 is a system diagram of an exemplary computer system on which at least one embodiment of the present disclosure can be implemented.

Additionally, an embodiment of the present disclosure can make use of software running on a computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the present disclosure, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

An exemplary embodiment may include a system, a method, and/or a computer program product at any possible technical detail level of integration. The computer program product may include a computer readable storage medium (or media) having computer readable program instructions thereon for causing a processor to carry out exemplary embodiments of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present disclosure.

Embodiments of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 502. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings provided herein, one of ordinary skill in the related art will be able to contemplate other implementations of the components.

Additionally, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
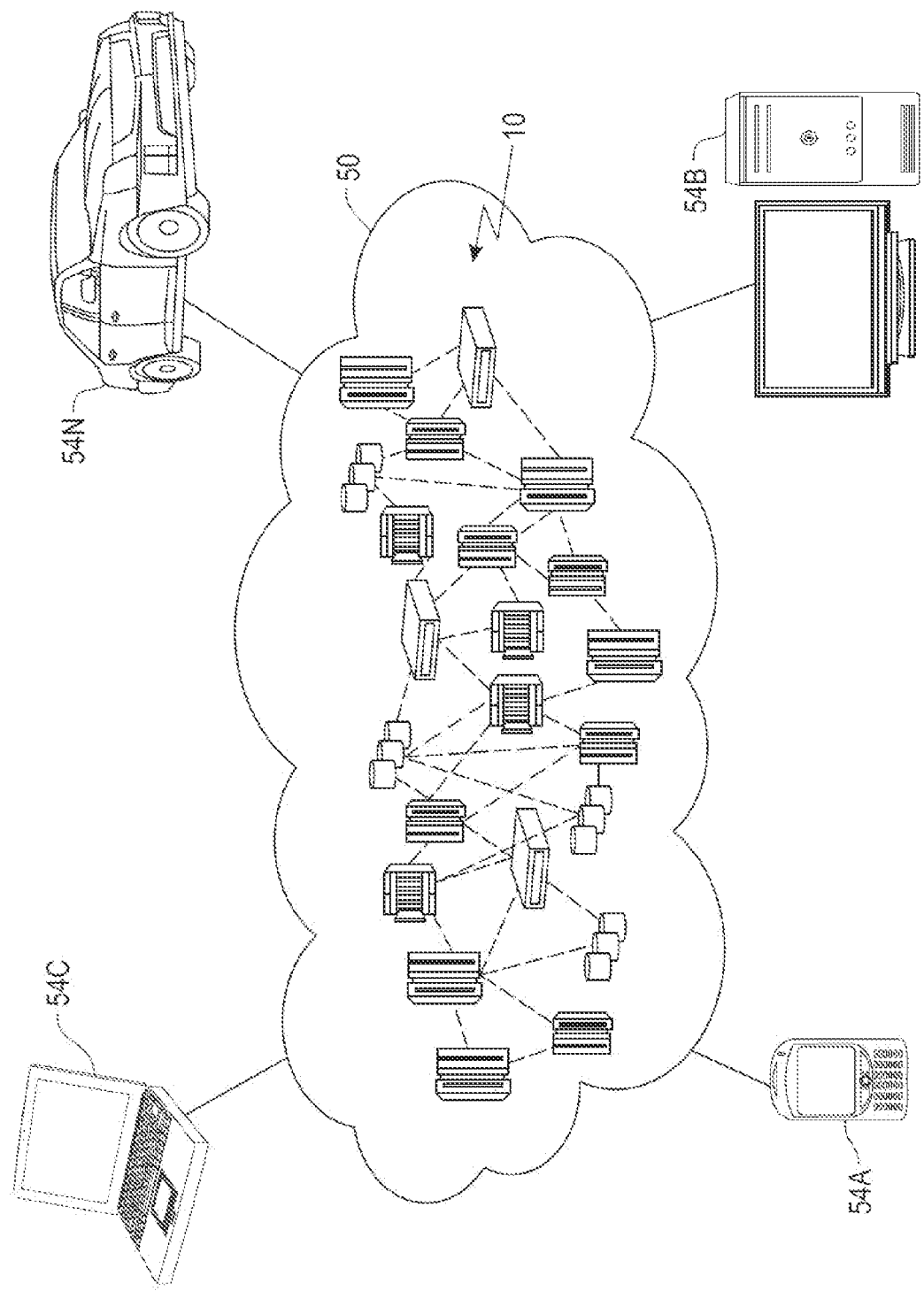
FIG. 6 depicts a cloud computing environment in accordance with exemplary embodiments.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
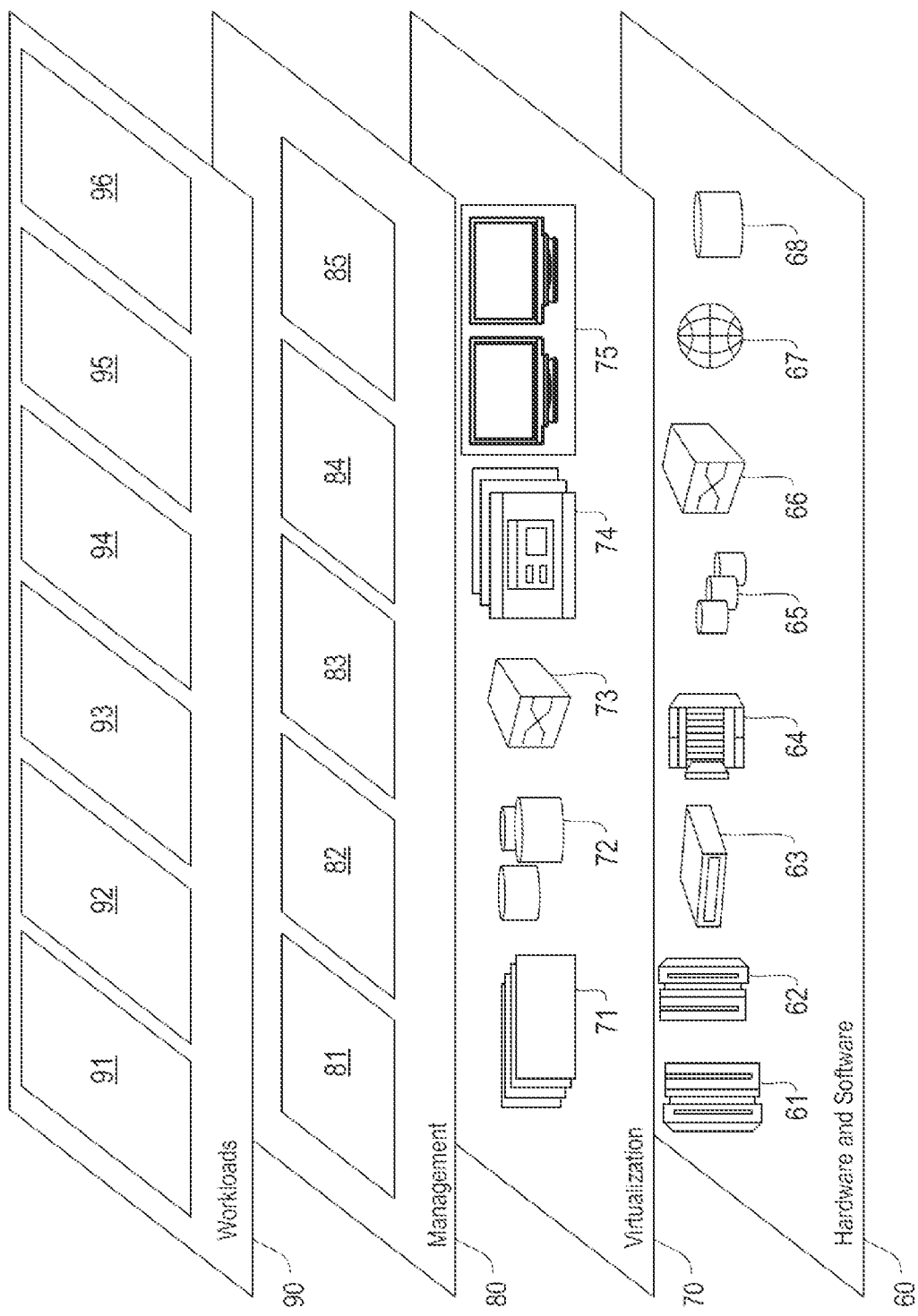
FIG. 7 depicts abstraction model layers in accordance with exemplary embodiments.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and identifying anomalous transformations using lineage data 96, in accordance with the one or more embodiments of the present disclosure.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present disclosure may provide a beneficial effect such as, for example, early detection of potential errors by automatically detecting anomalous transformation based on lineage data.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   tracking, by a computing platform, lineage data associated with database transformations executed on a set of columns within a plurality of datasets associated with the computing platform;
   generating, by the computing platform, a set of column profiles corresponding to the set of columns based at least in part on the lineage data, wherein the column profile for a given column comprises at least one of derivation information of the given column and usage information of the given column;
   analyzing, by the computing platform, glossary data to identify two or more columns in the set of columns that are related, wherein the glossary data comprises semantic information related to one or more common terms assigned to the two or more columns in the set of columns, and wherein a first column of the two or more columns corresponds to a first dataset of the plurality of datasets and a second column of the two or more columns corresponds to a second dataset of the plurality of datasets;
   enriching, by the computing platform, the lineage data of the column profiles corresponding to the two or more related columns, wherein the enriching comprises aggregating database transformations associated with the two or more related columns and consolidating the column profiles corresponding to the first column and the second column into a single column profile;
   obtaining, by the computing platform, information related to a new database transformation involving at least one column in the set of columns;
   determining, by the computing platform, whether the new database transformation is anomalous based at least in part on a comparison of the new database transformation to the set of column profiles and a data quality analysis associated with one or more database transformations identified in the enriched lineage data that are similar to the new transformation, and wherein the comparison comprises determining that the at least one column involved in the new database transformation is related to the two or more related columns based at least in part on the consolidated single column profile, extracting the aggregated database transformations from the enriched lineage data, and comparing the aggregated database transformations with the new database transformation;
   outputting, by the computing platform, an alert to a user of the computing platform comprising information that indicates the new database transformation is anomalous; and
   updating, by the computing platform, the set of column profiles based on a classification of the new database transformation provided as feedback from the user in response to the alert;
   wherein the method is carried out by at least one computing device.

2. The computer-implemented method of claim 1, wherein the generating comprises:
   determining one or more patterns in the usage data based on the usage information, wherein the one or more patterns are based on at least one of:
   one or more operators of database transformations involving the given column;
   one or more operands of database transformations involving the given column; and
   an order of the one or more operators and/or the one or more operands.

3. The computer-implemented method of claim 1, wherein the column profile for a given column comprises at least one of:
information indicating whether a name of the given column is based on a name of at least one of the other columns in the set of columns;
information indicating at least one other column in the set of columns that has been involved in a database transformation with the given column;
information categorizing database transformations performed on the given column based on the number of columns involved in the database transformations; and
expressions of the database transformation performed on the given column.

4. The computer-implemented method of claim 1, wherein the determining comprises:
analyzing the lineage data to identify one or more constraints associated with one or more of the columns in the set; and
determining whether data resulting from the new database transformation violates at least one of the constraints.

5. The computer-implemented method of claim 1, wherein the alert is output to a graphical user interface and the information comprises at least one of:
an explanation of why the new database transformation is anomalous; and
a user interface element for the user to provide the feedback on the new database transformation.

6. The computer-implemented method of claim 1, wherein software is provided as a service in a cloud environment.

7. A computer program product comprising a computer readable storage medium having program instructions embodied therewith, the program instructions executable by a computing device to cause the computing device to:
track, by a computing platform, lineage data associated with database transformations executed on a set of columns within a plurality of datasets associated with the computing platform;
generate a set of column profiles corresponding to the set of columns based at least in part on the lineage data, wherein the column profile for a given column comprises at least one of derivation information of the given column and usage information of the given column;
analyze, by the computing platform, glossary data to identify two or more columns in the set of columns that are related, wherein the glossary data comprises semantic information related to one or more common terms assigned to the two or more columns in the set of columns, and wherein a first column of the two or more columns corresponds to a first dataset of the plurality of datasets and a second column of the two or more columns corresponds to a second dataset of the plurality of datasets;
enrich, by the computing platform, the lineage data of the column profiles corresponding to the two or more related columns, wherein the enriching comprises aggregating database transformations associated with the two or more related columns and consolidating the column profiles corresponding to the first column and the second column into a single column profile;
obtain, by the computing platform, information related to a new database transformation involving at least one column in the set of columns;
determine, by the computing platform, whether the new database transformation is anomalous based at least in part on a comparison of the new database transformation to the set of column profiles and a data quality analysis associated with one or more database transformations identified in the enriched lineage data that are similar to the new transformation, and wherein the comparison comprises determining that the at least one column involved in the new database transformation is related to the two or more related columns based at least in part on the consolidated single column profile, extracting the aggregated database transformations from the enriched lineage data, and comparing the aggregated database transformations with the new database transformation;
output, by the computing platform, an alert to a user of the computing platform comprising information that indicates the new database transformation is anomalous; and
update, by the computing platform, the set of column profiles based on a classification of the new database transformation provided as feedback from the user in response to the alert.

8. The computer program product of claim 7, wherein the generating comprises:
determining one or more patterns in the usage data based on the usage information, wherein the one or more patterns are based on at least one of:
one or more operators of database transformations involving the given column;
one or more operands of database transformations involving the given column; and
an order of the one or more operators and/or the one or more operands.

9. The computer program product of claim 7, wherein the column profile for a given column comprises at least one of:
information indicating whether a name of the given column is based on a name of at least one of the other columns in the set of columns;
information indicating at least one other column in the set of columns that has been involved in a database transformation with the given column;
information categorizing database transformations performed on the given column based on the number of columns involved in the database transformations; and
expressions of the database transformation performed on the given column.

10. The computer program product of claim 7, wherein the determining comprises:
analyzing the lineage data to identify one or more constraints associated with one or more of the columns in the set; and
determining whether data resulting from the new database transformation violates at least one of the constraints.

11. The computer program product of claim 7, wherein the alert is output to a graphical user interface and the information comprises at least one of:
an explanation of why the new database transformation is anomalous; and
a user interface element for the user to provide the feedback on the new database transformation.

12. A system comprising:
a memory configured to store program instructions;
a processor operatively coupled to the memory to execute the program instructions to:
track, by a computing platform, lineage data associated with database transformations executed on a set of columns within a plurality of datasets associated with the computing platform;

generate a set of column profiles corresponding to the set of columns based at least in part on the lineage data, wherein the column profile for a given column comprises at least one of derivation information of the given column and usage information of the given column;

analyze, by the computing platform, glossary data to identify two or more columns in the set of columns that are related, wherein the glossary data comprises semantic information related to one or more common terms assigned to the two or more columns in the set of columns, and wherein a first column of the two or more columns corresponds to a first dataset of the plurality of datasets and a second column of the two or more columns corresponds to a second dataset of the plurality of datasets;

enrich, by the computing platform, the lineage data of the column profiles corresponding to the two or more related columns, wherein the enriching comprises aggregating database transformations associated with the two or more related columns and consolidating the column profiles corresponding to the first column and the second column into a single column profile;

obtain, by the computing platform, information related to a new database transformation involving at least one column in the set of columns;

determine, by the computing platform, whether the new database transformation is anomalous based at least in part on a comparison of the new database transformation to the set of column profiles and a data quality analysis associated with one or more database transformations identified in the enriched lineage data that are similar to the new transformation, and wherein the comparison comprises determining that the at least one column involved in the new database transformation is related to the two or more related columns based at least in part on the consolidated single column profile, extracting the aggregated database transformations from the enriched lineage data, and comparing the aggregated database transformations with the new database transformation;

output, by the computing platform, an alert to a user of the computing platform comprising information that indicates the new database transformation is anomalous; and update, by the computing platform, the set of column profiles based on a classification of the new database transformation provided as feedback from the user in response to the alert.

13. The computer-implemented of claim 1, wherein at least some of the database transformations executed on the set of columns correspond to structured query language statements executed by the computing platform, and wherein the lineage data comprises one or more parameters corresponding to the structured query language statements.

14. The system of claim 12, wherein the generating comprises:
determining one or more patterns in the usage data based on the usage information, wherein the one or more patterns are based on at least one of:
one or more operators of database transformations involving the given column;
one or more operands of database transformations involving the given column; and
an order of the one or more operators and/or the one or more operands.

15. The system of claim 12, wherein the column profile for a given column comprises at least one of:
information indicating whether a name of the given column is based on a name of at least one of the other columns in the set of columns;
information indicating at least one other column in the set of columns that has been involved in a database transformation with the given column;
information categorizing database transformations performed on the given column based on the number of columns involved in the database transformations; and
expressions of the database transformation performed on the given column.

16. The system of claim 12, wherein the determining comprises:
analyzing the lineage data to identify one or more constraints associated with one or more of the columns in the set; and
determining whether data resulting from the new database transformation violates at least one of the constraints.

17. The system of claim 12, wherein the alert is output to a graphical user interface and the information comprises at least one of:
an explanation of why the new database transformation is anomalous; and
a user interface element for the user to provide the feedback on the new database transformation.

18. The system of claim 12, wherein at least some of the database transformations executed on the set of columns correspond to structured query language statements executed by the computing platform, and wherein the lineage data comprises one or more parameters corresponding to the structured query language statements.

19. The computer program product of claim 7, wherein at least some of the database transformations executed on the set of columns correspond to structured query language statements executed by the computing platform, and wherein the lineage data comprises one or more parameters corresponding to the structured query language statements.

20. The computer-implemented of claim 1, wherein the alert further comprises text corresponding to the new database transformation and text corresponding to one of the aggregated database transformations.

* * * * *

UNITED STATES PATENT AND TRADEMARK OFFICE
CERTIFICATE OF CORRECTION

| | | |
|---|---|---|
| PATENT NO. | : 12,326,852 B2 | Page 1 of 1 |
| APPLICATION NO. | : 17/239900 | |
| DATED | : June 10, 2025 | |
| INVENTOR(S) | : Chandrahasan et al. | |

It is certified that error appears in the above-identified patent and that said Letters Patent is hereby corrected as shown below:

In the Claims

Column 17, Line 50, Claim 13 reading "The computer-implemented of claim 1" should read --The computer-implemented method of claim 1--

Column 18, Line 51, Claim 20 reading "The computer-implemented of claim 1" should read --The computer-implemented method of claim 1--

Signed and Sealed this
Fourteenth Day of October, 2025

John A. Squires
*Director of the United States Patent and Trademark Office*